E. M. LIEBERS.
FEEDER FOR GRAIN SEPARATORS.
APPLICATION FILED JULY 20, 1917.
1,339,206.
Patented May 4, 1920.
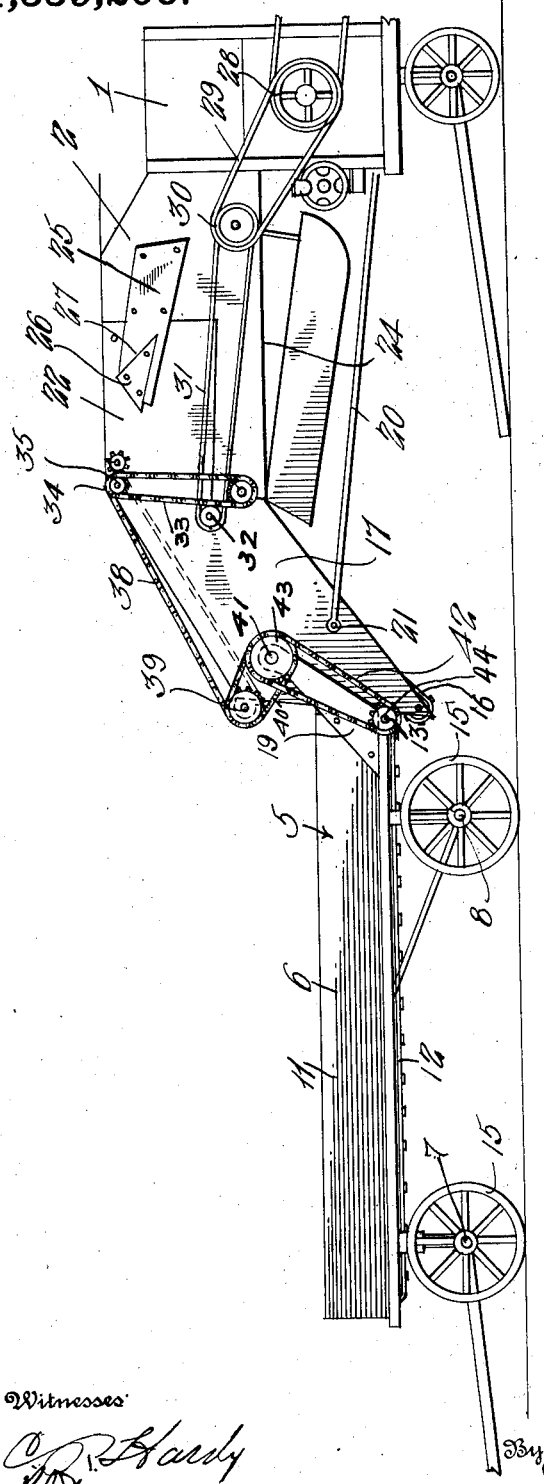
Witnesses
Inventor
E. M. Liebers
By
Attorney

UNITED STATES PATENT OFFICE.

EARNEST MAX LIEBERS, OF MINDEN, NEBRASKA.

FEEDER FOR GRAIN-SEPARATORS.

1,339,206. Specification of Letters Patent. Patented May 4, 1920.

Application filed July 20, 1917. Serial No. 181,806.

*To all whom it may concern:*

Be it known that I, EARNEST MAX LIEBERS, a citizen of the United States, residing at Minden, in the county of Kearney and State of Nebraska, have invented certain new and useful Improvements in Feeders for Grain-Separators; and I do hereby declare the following to be a full, clear, and exact description of the invention, such as will enable others skilled in the art to which it appertains to make and use the same.

This invention relates to a feeder for feeding bundles or sheaves of grain to the ordinary self-feeder mechanism of an ordinary grain separator employed for thrashing various types of grain, such as wheat, oats, clover or the like, and the primary object of the invention is to provide a portable feeder structure comprising a horizontally traveling conveyer which is carried by a low truck structure so as to materially decrease the height that it is necessary for the bundles of grain to be pitched and also eliminating the necessity of pitching the grain over the belts of the separator.

Another object of this invention is to provide an extension which is pivotally connected to the rear end of the portable truck structure and has an upwardly inclined conveyer carried thereby for receiving the grain from the horizontally traveling conveyer and delivering it to the ordinary conveyer of the self-feeding mechanism of the grain separator.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein is shown a side elevation of the improved feeder showing the same attached to an ordinary grain separator.

Referring more particularly to the drawings, 1 designates an ordinary grain separator, which has a self-feeding mechanism indicated by the numeral 2 carried thereby.

The feeder attachment which comprises this invention, is generically indicated by the numeral 5 and it includes a portable wagon or truck structure 6, which has front and rear axles 7 and 8. The truck structure includes a bed or box 11 in which is mounted a conveyer 12. The supporting wheels 15 of the truck structure, which are mounted upon the axles 7 and 8 are comparatively small so that the truck structure will be low for eliminating the high pitch of the grain.

The grain sheaves or bundles, which are pitched upon the upper rearwardly traveling run of the conveyer 12, by the grain pitcher, travel off the rear delivery end of the conveyer upon an upwardly inclined conveyer 16, which delivers the grain to the self feeding mechanism 2.

The conveyer 16 is carried by an auxiliary supporting structure 17, which auxiliary supporting structure is pivotally connected by trunnions 18 to brackets 19 which brackets are secured to the sides of the box 11. The pivotal connection between the auxiliary casing 17 and the bracket 19 permits the auxiliary casing and the mechanisms carried thereby to be swung upwardly and forwardly to a position above the truck structure 6, when it is desired to transport the feeder from one place to another.

The auxiliary supporting structure 17 has bracing bars 20 pivotally connected thereto as shown at 21, which brace bars are connected to the separator structure 1 in any desired manner and are provided for bracing and supporting the auxiliary supporting structure. The upper end 22 of the auxiliary supporting structure 17 is reduced and extends horizontally and fits over the reduced end portion 24 of the self feeder 2.

A pair of receiving members 25 are attached to the sides of the casing of the feeder 2 and they project beyond the forward edge of the feeder casing for engagement with the sides of the horizontal portions 22 of the auxiliary casing supporting structure 17. Substantially triangularly shaped inserting members 26 are carried by the sides of the casing 17 and they are provided for insertion in the recesses 27 formed in the forwardly projecting ends of the receiving members 25, for connecting the auxiliary supporting structure 17 to the casing of the feeder 2.

The self feeder is operated, in the usual manner, from the power wheel 28 of the separator, by means of a belt 29 which passes over a wheel 30 carried by a shaft which is also provided with a sprocket over which a sprocket chain 31 travels. The sprocket chain 31 also travels about a sprocket which is carried by a shaft 32. The shaft 32 extends through the casing or auxiliary supporting structure 17 and forms a support for the upper end of the conveyer 16. A sprocket chain 33 connects the shaft 32 to a shaft 34 which is positioned at the top of the auxiliary supporting casing 17.

The shaft 34 is connected through the medium of a sprocket chain 38 and the usual type of sprocket to a shaft 39, which shaft is carried at the lower upper part of the auxiliary supporting structure 17. The shaft 39 is connected through the medium of a sprocket chain 40 and a companion sprocket, with a shaft 41 and the shaft 41 is in turn connected to the shaft 13 by means of a sprocket chain 42 and sprockets 43 and 44.

The sheaves or bundles of grain are pitched, manually, into the bed 11 and upon the conveyer 12 which in turn delivers them to the elevating conveyer 16. The lower receiving end of the upper run of the conveyer 16 extends below the delivery end of the conveyer 12, so as to prevent the loss of any grain. The conveyer 16 elevates the sheaves or bundles of grain and delivers them to the self feeder 2.

When it is desired to transport the feeder from one place to another, the belt 31 is disconnected, and the supporting brackets or arms 20 are also disconnected from the feeder structure and the auxiliary structure 17 is swung upon its pivots 18 over the bed 11 of the truck structure, and this will cause the load of the structure to be borne by the truck of the truck structure 6 and facilitate the transportation of the feeder.

From the foregoing description taken in connection with the accompanying drawings, the advantages of construction and of the method of operation of the improved feeder for grain separators, will be readily apparent to those skilled in the art to which this invention appertains, and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a feeder for separators of the class described including a portable truck structure, an auxiliary supporting structure connected to and extending upwardly and rearwardly from the rear end of the truck structure and adapted to engage the rear end of the grain separator, of means carried by said auxiliary supporting structure for detachable connection with the side of the grain separator, said means comprising triangular shaped inserting members carried by the former and receiving members carried by the latter and provided at their forward ends with longitudinal recesses to receive said inserting member.

In testimony whereof I affix my signature in presence of two witnesses.

EARNEST MAX LIEBERS.

Witnesses:
ARTHUR H. LIEBERS,
GROVE HALL.